United States Patent [19]

Mott et al.

[11] 4,380,932
[45] Apr. 26, 1983

[54] CAPACITANCE MANOMETER DIFFERENTIAL PRESSURE SENSOR

[75] Inventors: Richard C. Mott, Harwood Heights; Thomas A. Stamm, Chicago, both of Ill.

[73] Assignee: Honeywell Inc., Minneapolis, Minn.

[21] Appl. No.: 239,808

[22] Filed: Mar. 2, 1981

[51] Int. Cl.³ .............................................. G01L 9/12
[52] U.S. Cl. ...................................... 73/749; 73/753; 361/283
[58] Field of Search ................... 73/749, 753; 361/283

[56] References Cited

U.S. PATENT DOCUMENTS 3,190,122 6/1965 Edwards .............................. 73/749

FOREIGN PATENT DOCUMENTS 1064889 4/1967 United Kingdom ................. 73/749

*Primary Examiner*—Donald O. Woodiel
*Attorney, Agent, or Firm*—Trevor B. Joike

[57] ABSTRACT

A transducer for providing an output signal having a value determined by an input pressure differential includes a capacitance manometer having a first input for receiving a first input pressure and a second input for receiving a second input pressure, the capacitance manometer having a capacitance determined by the difference between the first and second input pressures, and an output circuit connected to the capacitance manometer for providing an output signal having a value dependent upon the capacitance.

7 Claims, 4 Drawing Figures

CAPACITANCE MANOMETER DIFFERENTIAL PRESSURE SENSOR

BACKGROUND OF THE INVENTION

The present invention relates to a transducer for sensing differential pressures and, more particularly, to a manometer arranged as a capacitance sensor for sensing a differential input pressure.

Typical air conditioning systems for commercial and other type medium to large sized buildings comprise a plurality of fan systems for supplying air conditioned air to the zones or spaces within the building. Such zones are usually divided into two groups. Exterior zones are zones which have at least one wall exposed to the outside and represent cooling loads during the summer and heating loads during the winter. Interior zones are those which have no walls exposed to the outside and thus represent cooling loads during both summer and winter.

The fan system for supplying air conditioned air to exterior zones typically comprise a discharge air duct in which are located a fan, a cooling coil for cooling the air discharged by the fan during the summer and a heating coil for heating the air discharged by the fan during the winter. The discharge air duct is supplied with air from an outdoor air duct and a return air duct.

The fan system for supplying air conditioned air to interior zones typically include a fan for discharging air into the zone and a cooling coil for cooling that air. The discharge air duct is supplied with air from an outdoor air duct and from a return air duct.

In such systems, it is often desirable to be able to sense the velocity of air moving through the duct and thereby determine the amount of air being discharged to the zones. Thus, the velocity of air moving through the duct can be used to synchronize the fan in the discharge air duct to the fan which can be located in the return air duct to thus control the static pressure within the zones supplied by the fan system. The velocity of air moving through the duct can also be used for controlling the fan to thus regulate the amount of air being discharged by the fan to the zones.

There has been a problem in the past to find a velocity sensor which is capable of sensing low velocity pressures. Typical prior art devices provide good response only at higher velocity pressures. Moreover, typical prior art pressure sensors must convert the pressure signal into an electrical signal for use by electrical processing equipment. As such, these prior art devices were costly and complicated.

SUMMARY OF THE INVENTION

The present invention solves many of these problems by providing a manometer arranged as a capacitive sensor having a first input for receiving a first input pressure and a second input for receiving a second input pressure, the capacitance of the manometer being determined by the difference between the first and second input pressures, and an output circuit connected to the capacitance manometer for providing an output signal having a value dependent upon the capacitance.

BRIEF DESCRIPTION OF THE DRAWINGS

These and other features and advantages will become more apparent from a detailed consideration of the invention when taken in conjunction with the drawings in which.

DETAILED DESCRIPTION

A manometer is a relatively simple instrument that provides a direct measurement of pressure, vacuum and differential pressure. The manometer is also used for measuring flow by sensing the output of a pressure-differential producing device such as a venturi or orifice plate. The manometer operates on the fundamental principle of displacing a liquid column by an unknown pressure or pressure differential to be measured.

Figure 1:
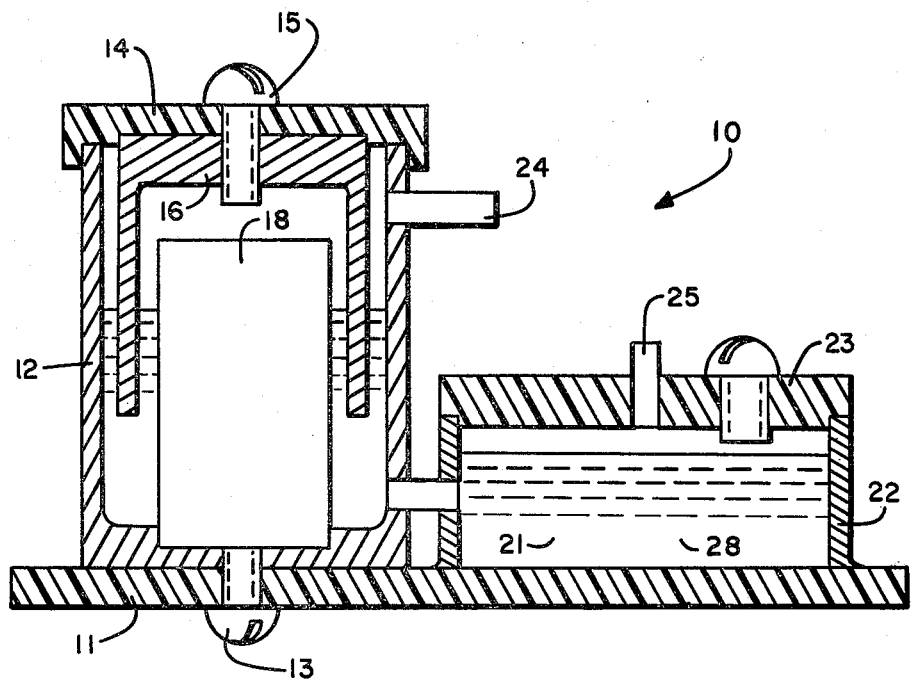
FIG. 1 shows one form of a capacitance manometer according to the instant invention.

Manometer 10 of FIG. 1 has base 11 on which is mounted a suitable metallic container 12 of any desired geometric shape such as a cylinder. An attachment device such as screw 13 can be used for holding metallic container 12 to base 11 and also provide an electrical contact to container 12. Located within container 12 is a solid block or cylinder 18 used for reducing the internal volume of metal cylinder 12. Cover 14 may be suitably attached to metal container 12 as by cement or threads and, like base 11, is formed of an insulating material such as plastic. Supported to cover 14 by a suitable attachment device in the form of screw 15 is a metal cup having any desired geometric shape 16 and is metallic to form the inner electrode of the capacitance sensor.

Dielectric fluid is allowed to flow into metal container 12 from reservoir 21 which is comprised of an outer wall 22, of any suitable geometric shape, attached as by cement to base 11 and having a cover 23 suitably attached thereto. Metal container 12 has a first input tube 24 for connecting a pressure input signal to the interior of metal container 12 and cover 23 has a second input 25 for connecting a pressure input signal to the interior of reservoir 21. The difference between the pressures applied to inputs 24 and 25 will determine how much dielectric fluid is forced between reservoir 21 and the areas between metal container 12, in the form of the outer electrode of the capacitance sensor, inner electrode 16 and block 18.

This dielectric fluid has a different dielectric constant from the air supplied to the interior of outer electrode 12 by input 24 and, thus, the level of dielectric fluid within container 12 will determine the capacitance between inner electrode 16 and outer electrode 12. This capacitance can then be sensed between screws 13 and 15 acting as terminals.

Figure 2:
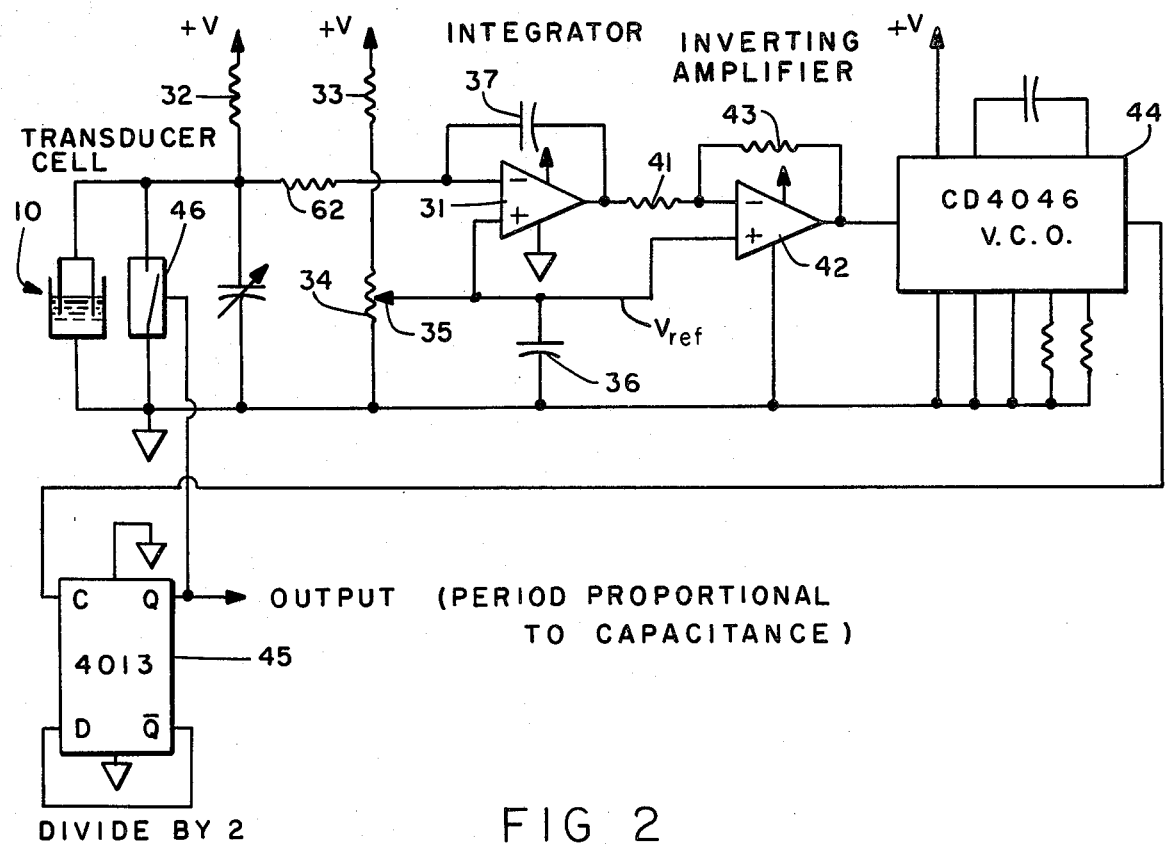
FIG. 2 shows an electrical circuit responsive to the capacitance of the manometer for providing an output signal having a frequency dependent on the capacitance.

Manometer 10 is shown connected into the circuit of FIG. 2. Capacitor sensor 10 is connected between ground and the inverting input of integrating amplifier 31. The inverting input of amplifier 31 is also connected to a positive source through resistances 32 and 62. Connected between the positive source and ground is a bridge formed by resistors 33 and potentiometer 34, potentiometer 34 having a wiper arm 35 connected to the noninverting input of amplifier 31. Capacitor 36 is connected from the wiper arm to ground. The output of amplifier 31 is connected back to its inverting input by capacitor 37. The output of amplifier 31 is also connected through resistor 41 to the inverting input of amplifier 42 having an output connected back to its inverting input by resistor 43. The noninverting input of amplifier 42 is connected to wiper arm 35 of potentiometer 34 and the output of amplifier 42 is connected to the VCO input of voltage controlled oscillator 44 which may be in the form of a CD4046 and is connected as shown. The output of this voltage controlled oscillator is connected to the C input of divide-by-two circuit 45 which may be a 4013. The output of divide-by-two circuit 45 supplies an output signal having a period dependent upon the capacitance of capacitance manometer 10 and is also connected back to switch 46 in the form of a CD4066TS having capacitor 63 connected in parallel thereto. When switch 46 is open, capacitance manometer 10 is allowed to charge, and when analog switch 46 is closed, capacitance manometer 10 is allowed to discharge.

In operation, as the capacitance of capacitor transducer 10 decreases, for example, in response to a change in the differential input pressure applied through the transducer at input connectors 24 and 25, the average voltage across capacitor transducer 10 will increase. A higher average transducer voltage will cause the output of integrating amplifier 31 to drift down at a rate determined by the difference between the average transducer voltage and the reference voltage on wiper 35. This output voltage is inverted by amplifier 42 and supplied to voltage controlled oscillator 44 where the upward drift in voltage will cause a decrease in the VCO's output period. As the period of the output voltage VCO 44 decreases, so will the period of the output from divider 45. This decreasing output period will decrease the average voltage across transducer capacitor 10. As the loop settles toward balance and the error voltage decreases, the change in period will slow until, after sufficient time, the VCO period will represent the value of transducer capacitance. On the other hand, an increase in transducer capacitance will increase the VCO output period.

Figure 3:
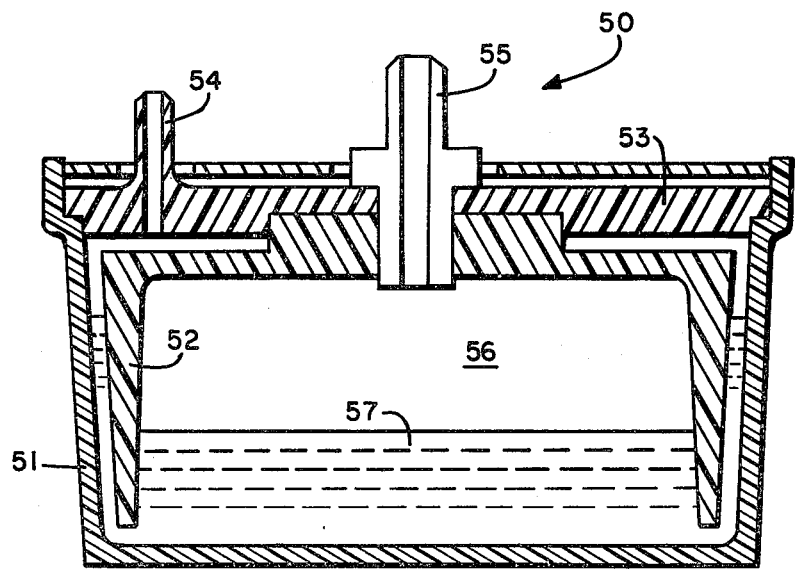
FIG. 3 shows another form of a capacitance manometer according to the present invention; and, FIG. 4 shows a typical system in which the capacitance manometer sensor according to the present invention can be used.

Capacitance manometer 50 shown in FIG. 3 is an alternative construction. The important feature of capacitance manometer 50 is the concentricity of the capacitor and the dielectric fluid reservoir, i.e. the capacitor formed by electrodes 51 and 52 is concentric with reservoir 56. Although capacitance manometer 50 is shown with the reservoir within electrodes 51 and 52, the fluid reservoir could be constructed with electrodes 51 and 52 inside. As long as electrodes 51 and 52 are concentric, the average fluid level between reservoir and manometer will remain relatively constant as the manometer is tipped. Therefore, the requirement for absolute level conditions is not so stringent.

Thus, as shown in FIG. 3, capacitance manometer 50 comprises a container 51 which may be formed from a conductive plastic and forms the outer electrode of capacitance manometer 50. The inner electrode is formed by cup 52 which inserted within outer electrode 51 and forms the inner electrode of the capacitance manometer 50. Inner electrode 52 may also be formed of a conductive plastic. Cover 53 is formed of a nonconductive plastic and has a first input nozzle 54 and a second input nozzle 55 extending therethrough. One pressure may be applied to nozzle 54 and the second pressure may be applied to nozzle 55 to regulate the difference between the level of dielectric fluid within the reservoir 56 formed within the inner electrode 52 and the level of dielectric fluid existing between inner electrode 52 and outer electrode 51. Dielectric fluid 57 again is a dielectric which changes the capacitance of capacitance manometer 50 as the level of dielectric fluid 57 between outer electrode 51 and inner electrode 52 changes. Nozzle 55 may be a conductive nozzle connected to inner electrode 52 and a connector may be attached directly to outer electrode 51. Capacitance manometer 50 may then be connected in the type of circuit shown in FIG. 2.

Figure 4:
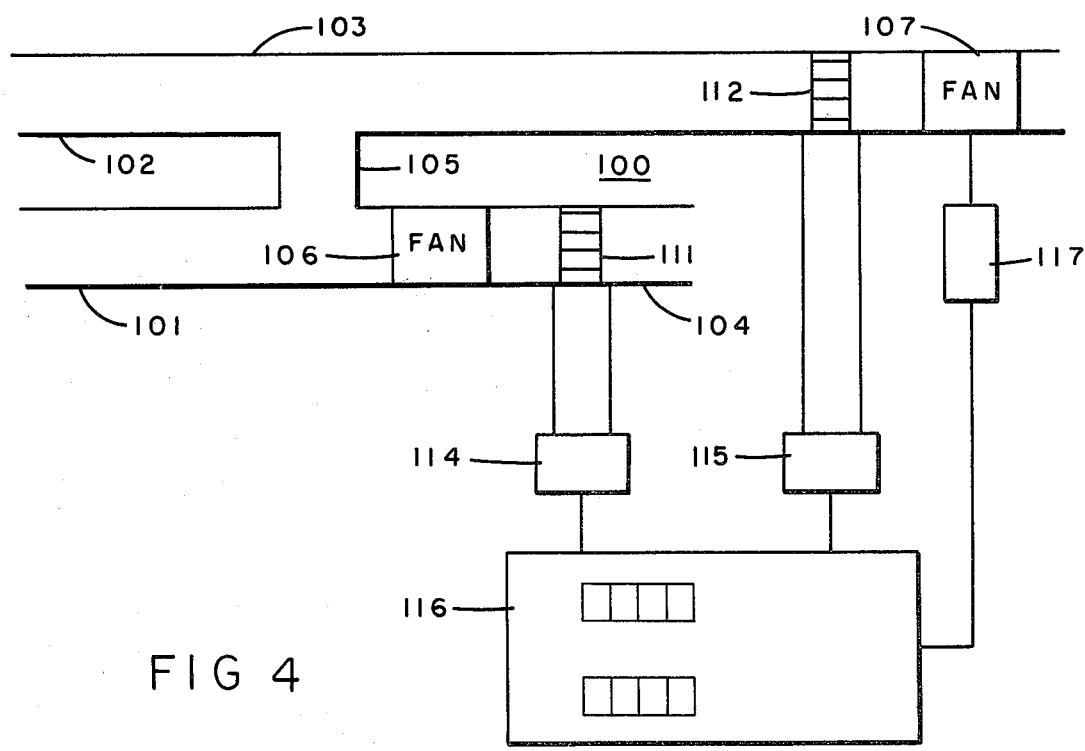

FIG. 4 shows an example of one way in which the capacitive manometer according to the present invention can be used. In FIG. 4, fan system 100 comprises an outdoor air duct 101 for bringing in outdoor air, exhaust air duct 102 for exhausting return air to the outside of the building within which fan system 100 is located, return air duct 103 for returning air from the zones supplied by fan system 10, and discharge air duct 104 for discharging air to the zones under control. Mixing duct 105 allows return air to be mixed with outdoor air to be discharged through discharge air duct 104 by fan 106. Fan 107 is located in return air duct 103 and aids in returning air from the zone and exhausting air from the building.

In systems of the type shown in FIG. 4, it is desired to synchronize fans 106 and 107 so that a predetermined static pressure may be maintained within the zones supplied by discharge air duct 104. Thus, if fan 106 is working harder than fan 107, the pressure within the zone supplied by discharge air duct 104 is increased. Likewise, if fan 106 is not working as hard as fan 107, the static pressure within the zone supplied by discharge air duct 104 is decreased. Thus, it is desired to keep a constant static pressure within these zones.

To this end, flow station 111 is located within discharge air duct 104 and flow station 112 is located within return air duct 103. These flow stations establish a pressure drop thereacross which is indicative of the velocity pressure of the air being moved through ducts 104 and 103 and thus the amount of air moving therethrough. Capacitance manometer 114 has its first input connected on one side of flow station 111 and its second input connected on the other side of that flow station. Likewise, capacitance manometer 115 has its first input connected on one side of flow station 112 and its second input connected on the other side of that flow station.

The output from capacitance manometer 114 is thus an output signal having a frequency determined by the pressure drop or differential across flow station 111 and the output from capacitance manometer 115 has a frequency dependent upon the pressure drop or differential across flow station 112. These outputs can then be used by controller 116 which operates through actuator 117 for controlling fan 107 to synchronize fans 106 and 107 to maintain a predetermined static pressure within the zone supplied by discharge air duct 104.

It should be noted that Pitot tubes can be used instead of flow stations for sensing air flow through ducts 104 and 103. In the case of Pitot tubes, nozzle 24 of FIG. 1 or 54 of FIG. 3 is connected to the static pressure pick up tube and nozzle 25 of FIG. 1 or 55 of FIG. 3 is connected to the total pressure pick up tube.

It should also be noted that one of the input tubes could be connected to a reference input pressure.

The embodiments of the invention in which an exclusive property or right is claimed are defined as follows:

1. A transducer for providing an output signal having a value determined by an input pressure differential comprising:
   capacitance manometer means having a first input for receiving a first input pressure and a second input for receiving a second input pressure, said capacitance manometer means having a capacitance determined by the difference between said first and second input pressures, said capacitance manometer means having an outer electrode and an inner electrode, and a reservoir of dielectric fluid, said inner electrode located within said outer electrode and said inner and outer electrodes and said dielectric fluid reservoir all being concentric with one another such that the differential pressure between the first and second input pressures determines the level of dielectric fluid between said inner and outer electrodes; and,
   output means connected to said capacitance manometer means for providing an output signal having a value dependent upon said capacitance.

2. The transducer of claim 1 wherein said first input connects said first input pressure between said outer and inner electrodes and said second input connects said second input pressure to said dielectric fluid reservoir located within said inner electrode.

3. The transducer of claim 2 wherein said output means comprises frequency conversion means responsive to said capacitance for supplying an output signal having a frequency dependent upon said capacitance.

4. The transducer of claim 3 wherein said frequency conversion means comprises amplifying means having a first input connected to said capacitance manometer means and a second input connected to a reference means, voltage controlled oscillator means for supplying an output having a frequency depending upon an input voltage received from said amplifier means, and a switch responsive to the output of said voltage controlled oscillator means and connected to said capacitance manometer means for controlling the charging of said capacitance manometer means.

5. a transducer for providing an output signal having a value determined by an input pressure comprising:
   capacitance manometer means having input means for receiving a pressure input signal, said capacitance manometer means having a capacitance dependent upon said pressure input signal, said capacitance manometer means having an outer electrode and an inner electrode, and a reservoir of dielectric fluid, said inner electrode being located within said outer electrode and said inner and outer electrodes and said dielectric fluid reservoir all being concentric to one another, said pressure input signal controlling the level of dielectric fluid between said inner and outer electrodes; and,
   output means responsive to said capacitance manometer means for providing an output signal having a value dependent upon said capacitance.

6. The transducer of claim 5 wherein said output means comprises frequency conversion means responsive to said capacitance for supplying an output signal having a frequency dependent upon said capacitance.

7. The transducer of claim 6 wherein said frequency conversion means comprises amplifying means having a first input connected to said capacitance manometer means and a second input connected to a reference means, voltage controlled oscillator means for supplying an output having a frequency depending upon an input voltage received from said amplifier means, and a switch responsive to the output of said voltage controlled oscillator means and connected to said capacitance manometer means for controlling the charging of said capacitance manometer means.

* * * * *